Nov. 21, 1967   J. R. BENFORD   3,353,440
NAVIGATION PELORUS

Filed April 26, 1965                    3 Sheets-Sheet 1

JAMES R. BENFORD
INVENTOR

BY *Frank C. Parker*

ATTORNEY

Nov. 21, 1967  J. R. BENFORD  3,353,440
NAVIGATION PELORUS

Filed April 26, 1965  3 Sheets-Sheet 2

JAMES R. BENFORD
INVENTOR

BY Frank C. Parker

ATTORNEY

Nov. 21, 1967  J. R. BENFORD  3,353,440
NAVIGATION PELORUS

Filed April 26, 1965  3 Sheets-Sheet 3

JAMES R. BENFORD
INVENTOR

BY Frank C. Parker

ATTORNEY 3,353,440
NAVIGATION PELORUS
James R. Benford, Irondequoit, N.Y., assignor to Bausch
& Lomb Incorporated, Rochester, N.Y., a corporation
of New York
Filed Apr. 26, 1965, Ser. No. 450,736
13 Claims. (Cl. 88—2.3)

The present invention relates to a navigation pelorus and more particularly it relates to improvements therein.

Peloruses currently in use are usually characterized by sophisticated construction for use in comparatively expensive installations on larger craft. On the other hand, inexpensive peloruses for smaller boats are usually characterized by light construction and lack of ruggedness as well as unsatisfactory operation.

It is an object of the present invention to provide a navigation pelorus of superior quality and capability which is moderate in price but embodies rugged and reliable construction.

It is a further object to provide such a device whereby all of the operations which ordinarily characterize expensive instruments may be effectively provided, said device being easy to maintain in good working order and being of good appearance and providing an unobstructed view of the horizon.

It is a further object to provide such a device having an aiming circle which is seen at infinity sharply defined against the distant target, so that continual re-focusing of the eye is not necessary.

It is a further object to provide a pelorus wherein the aiming circle need not be continuously aimed at the distant target but need only be aimed to bring the target within the field of view, such, for instance, as 20°.

It is a still further object to provide such a device wherein simultaneous direct reading and observing the field of view is achieved so that shifting from observing to scale reading is no longer required, and wherein a magnification of the divided circle is provided to give greater accuracy and ease to the read-out.

Further objects and advantages will be apparent in the combinations and arrangements of the parts thereof and in the details of construction, reference being had to the following specification and accompanying drawings for a full disclosure of the invention.

Figure 1:
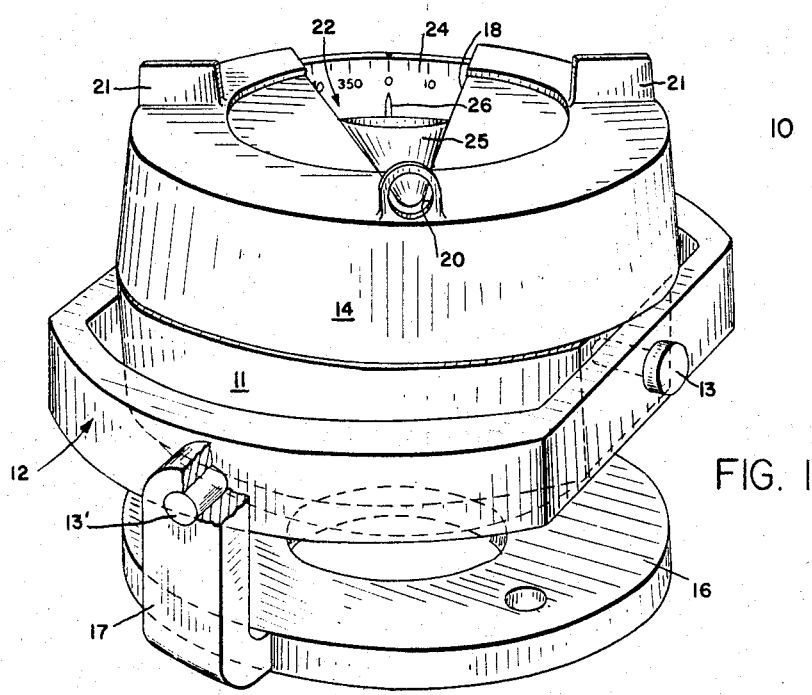
FIG. 1 is a perspective view of a preferred form of the present invention.
Figure 2:
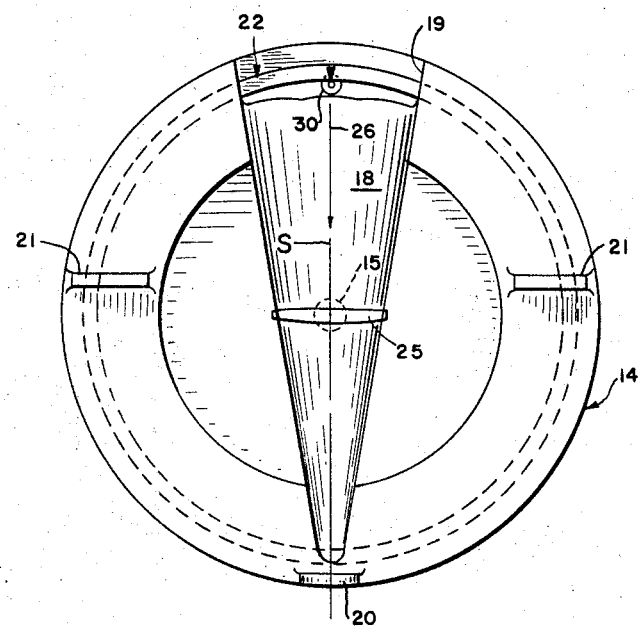
FIG. 2 is a plan view of the device shown in FIG. 1.

One successful form of navigation pelorus is shown in FIG. 1 of the drawings and is represented generally by the numeral 10. The principal members which are combined to form said pelorus include an underslung body member 11 on which all of the operating parts are mounted, a gimbal mechanism 12 having pivots 13 and 13' for supporting the body member in a normally level attitude, and a rotatable member 14 which is mounted on said body member 11 for rotation about a central vertical shaft 15 thereof, shown in FIG. 3, the shaft being journaled in the body member.

Although most forms of peloruses are supported on gimbals, it should be understood that some forms of peloruses are hand-held and may be used in any suitably clear area on a naval craft.

As above mentioned, the body member 11 is underslung, i.e., the weight of the mass underlying the level of the pivots 13 is predominant and acts as ballast to keep the body member upright. The base 16 for the gimbal mechanism 12 may be constructed in any suitable manner for the installation required, said base including a pair of upright posts 17 in which the pivots 13' are held.

According to the present invention, on the rotatable member 14, means are constructed for providing a field of view with axis of symmetry S, said means including a semiconical recessed surface 18 extending across the top of the rotatable member 14 from side to side and forming a deep opening 19 on the side wall thereof. Centrally of the narrow end of said recessed surface 18 is formed an erect aperture sight 20 on the rim of the rotatable member 14 to assist in locating the eye-position.

Means for assisting in handling the rotatable member 14 are provided in one form as protrusions 21 extending upwardly from the top part of the member.

Peripherally on the top surface of the body member 11 and beneath the rotatable member 14 is mounted an erect cylindrical ring 22, said ring being seated along its lower edge in a fitted groove 23. Said ring 22 is preferably formed of a transparent material such as methyl methacrylate or glass and may be of spherical sectional shape or otherwise than cylindrical if necessitated in some other forms of the invention. Next to the top edge of said ring 22 on its curved outer surface, a 360° scale 24 is suitably formed so that it may be seen through the sight aperture 20 and opening 19. The 0°–180° axis of said scale 24 is normally directed parallel to the keel of the boat on which the pelorus is used so that the 0°–180° may serve together with the sighting aperture 20 as a lubber line. The scale, however, may be made adjustable, so that its zero aims, for instance, at true or compass north.

The principal feature of the present invention resides in the lens means which are so situated with regard to the line of sight that the scale 24 appears at infinity within the field of view along with the distant horizon as seen through the aperture sight 20. In the preferred form of the present invention, said lens means is provided by mounting a half-lens 25 in a vertical position at substantially the midpoint of the recessed surface 18, the flat side of said lens lying substantially in the plane of the upper edge of the ring 22. Said lens is secured therein preferably by cement whereby a horizontally divided field of view is provided.

Said lens 25 is a positive lens having a focal length substantially equal to the distance from the lens to the scale 24 which is substantially equal to the radius of the ring 22 so that an image of the scale 24 is formed at infinity and is seen in juxtaposition to the distant field as seen by sighting over the top of the half-lens 25.

Figure 3:
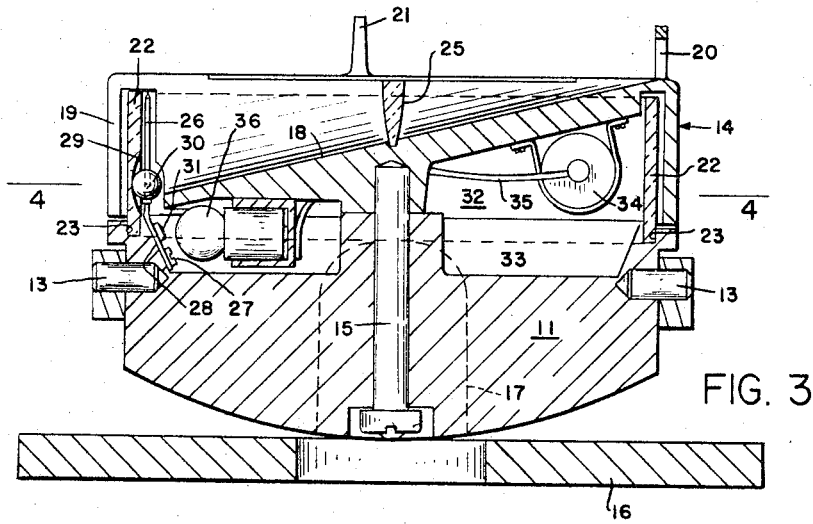
FIG. 3 is a vertical midsectional view of a navigation pelorus similar to the device shown in FIG. 1.
Figure 4:
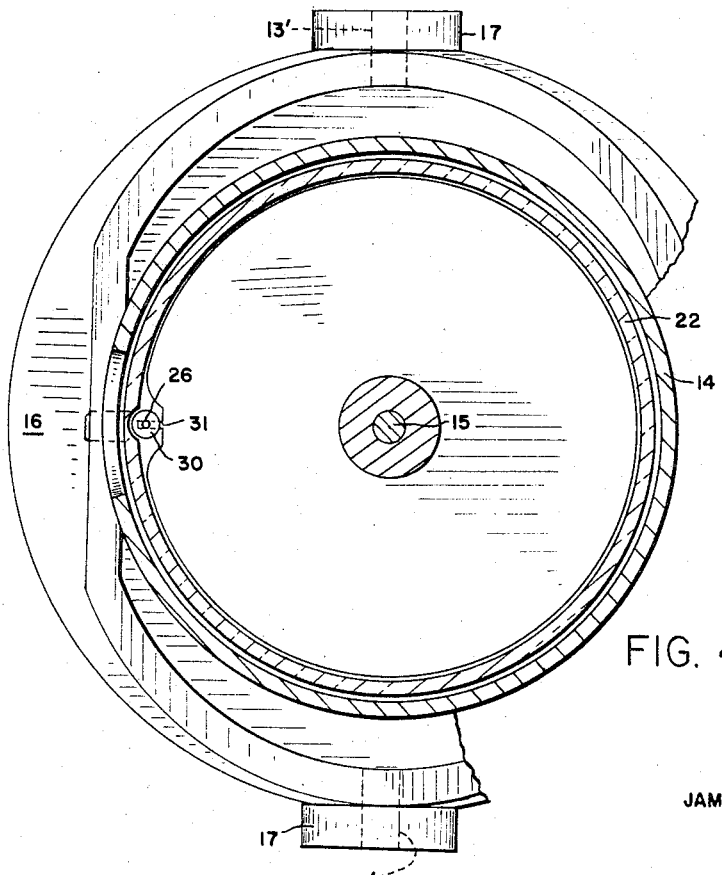
FIG. 4 is a horizontal sectional view taken on the line 4—4 of FIG. 3.

In the usual pelorus device, the ring 22 which supports the scale 24 is so fitted into the seating groove 23 that the ring may be moved angularly so that the true compass heading is set in line with the "lubber line." Such a mechanism requires the provision of a lubber line indicator which marks the direction of the keel line as viewed through the aperture sight 20. Such a lubber line indicator 26 is shown in FIG. 3 according to one preferred form of the invention.

Indicator 26 is constructed in this form of the invention from spring wire which is suitably secured as by means of a screw 27 or other holding device onto an interior wall 28 so as to project in cantilever fashion vertically in close proximity to the inside surface of the ring 22.

Since the ring 22 may be moved angularly in its seating groove 23 as aforementioned, means are provided for releasably retaining the ring in a position wherein the 0°–180° axis of the scale 24 is held parallel to the keel of the boat. Such means comprise a curved recess shaped by the reentrant surface 29 whereon a detent ball 30 engages. The detent ball 30 is resiliently pressed onto surface 29 by rotatably mounting the ball on the spring wire 26 which also serves as a lubber line indicator. In this way it will be seen that the lubber line indicator 26 serves two purposes. To prevent tipping of the indicator 26, it may be confined in its movement by a pair of parallel walls 31 forming the sides of a radial slot which is a part of the wall 28.

In the above-described form of the invention, it will be noticed that the vertical sides of the rotatable member substantially enclose and protect the scale ring 22 which is made of methyl methacrylate or glass, and even the exposed lens 25 is held in a recessed surface 18 beneath the top of the instrument.

The underside of the rotatable member 14 is hollow, thus forming a chamber 32, and a companion chamber 33 is formed below it in the body member 11. Chambers 32 and 33 together accommodate means for illuminating the scale 24, said means comprising, as shown in FIG. 3, a battery or batteries 34 which are suitably hung on the underside of member 14. Said batteries are connected by suitable leads 35 to a small lamp 36 which is suspended in any preferred manner on the underside of member 14 near the scale ring 22. The walls of chambers 32 and 33 reflect light from the lamp more or less indirectly upon the observed part of the scale ring 22.

Figure 5:
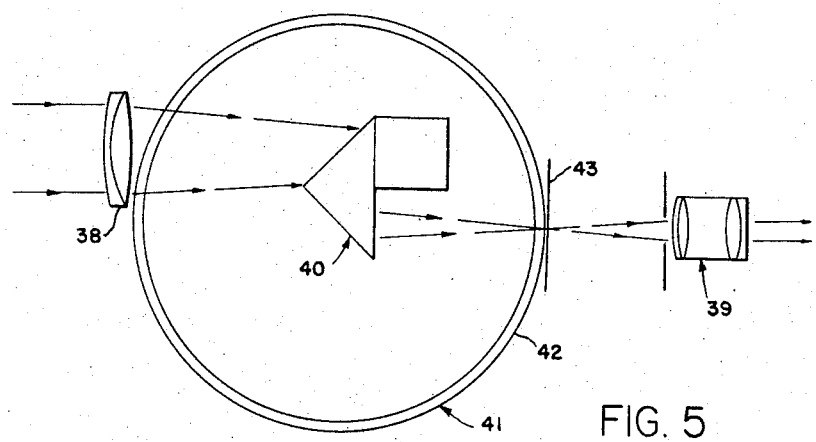
FIGS. 5 and 6 are schematic diagrams in plan and side elevational views of a second form of the invention.
Figure 6:
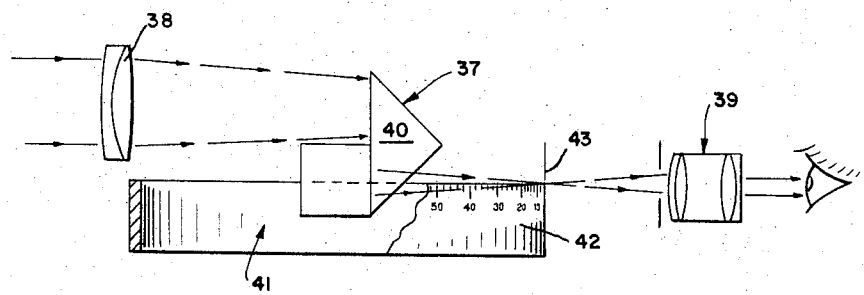

A second form of the present invention is shown somewhat schematically in FIGS. 5 and 6 wherein a telescope 37 having an objective lens 38, an eyepiece 39 and a prism-type erector 40 is combined with a scale ring 41 to provide a pelorus. The scale 42 in this form of the invention is opaque preferably and is formed on the outer surface of the ring 41, said ring being held in a seating groove similar to the groove 23 of FIG. 3.

As seen in FIGS. 5 and 6, parallel light entering the telescope objective 38 is brought to a focus in a focal plane 43 which is substantially coincident with the scale 42 and the eyepiece is focused simultaneously on both the scale 42 and the image formed at 43 so that both elements are visible in the field of view. The telescope type of pelorus has the advantage obviously of magnifying the distant field so that it appears larger and closer than the field seen with the naked eye. The success of this combination of mechanism depends primarily therefore in locating the optical axis of the telescope close to the top edge of the scale 42 so that the scale and the image formed by the objective are brought into juxtaposition.

It is also understood that the scale 42 is held stationary at least during the time that readings are taken, while the telescope 37 is mounted to rotate about the center of the ring 41. Furthermore, the optical axis of the telescope at said image is directed radially with respect to the ring 41.

Figure 7:
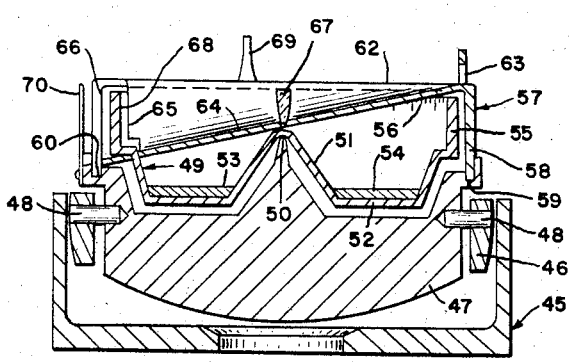
FIG. 7 is a full sectional view of another form of the invention.

In another form of the invention shown in FIG. 7, a compass is combined with the pelorus to automatically show a magnetic bearing of any landmark without recourse to a separate compass reading. The form of the invention shown in FIG. 7 follows in some respects the form shown in FIG. 3 and comprises a gimbal base 45 and gimbal ring 46 whereon a body member 47 is held in a normally level position by the pivot pins 48. Said pins 48 are set high in the body member to assure that the member 47 acts as a pendulum to maintain the pelorus in a level condition.

The new feature herein disclosed as shown in FIG. 7 is the provision of a magnetically held dish-shaped compass member 49 which is pivotally held for free swinging motion on a central pivot 50 formed on the body member 47, the bearing socket wherein the pivot engages being constructed in the form of a conical dome 51 to provide a pendulous stable suspension thereof.

On the lowest wall 52 of the member 49 is suitably fixed a pair of bar magnets 53 and 54 which are unidirectionally arranged on diametrically opposite sides of the conical socket 51. The upper part of the compass member 49 is constructed in the form of a thin erect cylindrical ring portion 55 whereon a 360° scale 56 which serves as a compass card is provided. If the ring portion 55 is formed of opaque material, the scale 56 is affixed to the inside surface thereof.

Enclosing and overlying the compass member 49 is a supporting shell or cover 57 having an erect cylindrical wall 58 which is spaced radially from the ring portion 55 and terminates at the bottom in a planar edge surface 59. The planar edge surface 59 rests in a loosely fitted groove 60 formed in an enlarged rim portion 61 of the body member 47 so that the wall 58 may be moved therein.

A top wall 62 is formed on the cover 57 parallel to and spaced from the top edge of the ring portion 55. Sighting means are formed on the top wall 62 comprising an upright aperture sight 63 or peep sight which is aligned with a depressed semi-conical wall 64 extending therefrom across the center of the top wall. The semi-conical wall terminates at a front edge 65 which marks the inner boundary of a cutaway portion 66 of the cover including an opening in the wall 58.

Further comprised in said sighting means is a semi-circular half-lens 67 of positive power which is located approximately over the central pivot 50 at a horizontal distance from the scale surface 68 which is substantially equal to the focal length of the lens so that the sighting means operates in the same manner as described heretofore in connection with FIG. 1.

Like the embodiment of the invention shown in FIG. 1, the cover or support shell 57 is slidable in the loose-fitting groove 60 of the body member 47 so that the sighting mechanism may be swung in azimuth during the sighting operation, and to facilitate such use a pair of finger lugs, one of which is shown at 69, is formed erectly on the top surface 62 of the shell. A lubber line indicator of any preferred form such as an indicia 70 may be fixed to the outer rim of the body member 47.

With the positive lens 67 focused on the scale surface 68 as described, an image of the scale is formed at infinity in juxtaposition with the distant view of the horizon so that both may be seen simultaneously without any annoying change of eye accommodation. During sighting of the instrument, the compass member 49 remains oriented in the direction of the north magnetic pole so that the compass heading of the ship may be seen on the scale 56, and the pelorus sightings are direct compass bearings of the objects being sighted.

Although only certain forms of the present invention have been shown and described in detail, other forms are possible and changes may be made in the form and arrangement of the parts and in the details of construction thereof without departing from the spirit of the invention as defined in the appended claims.

I claim:

1. A navigation pelorus for a ship, said pelorus having in combination
   a body member,
   means including gimbal mechanism for supporting said member in a normally level position while preventing motion thereof in azimuth,
   an upstanding circular ring operatively carried by said body member for relative rotational adjustment therebetween,
   a 360° scale formed adjacent to the top of said ring on one of the cylindrical surfaces of the ring,
   a rotatable member overlying and enclosing said ring, means for mounting the rotatable member for relative movement in azimuth on the body member, means carried by said body member for indicating a lubber line located in parallel to the keel of the ship, and means operably constructed diametrically across the top of the rotatable member for defining a horizontally divided field of view, said means including an aperture sight fixed on the last said member near one edge thereof and on the center of symmetry of said field of view, said last means additionally including a positive half-lens which is located at its focal length from said scale in the direction of the aperture sight along said line.

2. A navigation pelorus having in combination a body member, means including gimbal mechanism for supporting said member in a normally level position while preventing angular motion thereof in azimuth relative to the boat on which it is mounted, an erect cylindrical ring secured adjacent to the outer edge of said body member and terminating in a top surface which is generally parallel to said member, a 360° scale formed adjacent to said top surface on one of the cylindrical surfaces of said ring, a rotatable member overlying said body member and pivotally mounted thereon at its center, means carried by said body member for indicating a lubber line which is located parallel to the keel of the boat whereon the pelorus is used, and means operably constructed on said rotatable member for defining a horizontally divided field of view, said means including on the center of symmetry of said field of view an aperture sight located near the outer edge of said member and additionally including a positive half-lens which is located substantially at its focal length from said scale along said center of symmetry.

3. A navigation pelorus comprising a stationary stand, a gimbal mechanism mounted thereon, a body member supported by said gimbal mechanism in a normally level position and oriented in the same direction as said stand, an erect cylindrical ring held on said body member adjacent to its outer edge and terminating in an upper surface lying generally parallel to said member, a 360° scale formed on the curved surface of said ring contiguous to said upper surface, means for defining a lubber line parallel to the keel of the boat whereon the pelorus is used, a circular rotatable member pivotally mounted at the center of said body member and extending thereover, and means operably constructed on said rotatable member for defining a horizontally divided field of view across said upper surface toward a horizon, said means including an aperture sight and further including a half-lens which is located away from said scale substantially at its focal length.

4. A navigation pelorus comprising a stationary stand, a gimbal mechanism mounted thereon, a body member supported by said gimbal mechanism in a normally level position and oriented in the same direction as said stand, an erect cylindrical ring fixed on said body member equidistant from the periphery thereof and terminating in an upper rim lying parallel to said member, a 360° scale formed on a curved surface of said ring contiguous to said rim, the 0°–180° line being directed parallel to the keel of the boat on which it is mounted so as to provide a lubber line, a circular rotatable member pivotally mounted at the center of said body member and extending thereover, and means operably constructed on said rotatable member for defining a horizontally divided field of view aimed toward a horizon, said means including an optically aligned aperture sight and a positive half-lens which are spaced from each other, said lens being optically aligned with said scale and being spaced therefrom by the focal length thereof.

5. A navigation pelorus for a nautical craft comprising a stationary stand, a gimbal mechanism mounted thereon, a body member supported by said gimbal mechanism in a normally level position and oriented in the same direction as said stand, an erect cylindrical ring seated on said body member at a constant distance from the periphery of the member and having upper and lower parallel surfaces, a pair of upright concentric circular surfaces and a flat annular connecting surface therebetween which together define an annular groove which is fitted to slidably receive the lower part of said ring, a 360° scale formed on a curved surface of said ring contiguous to said upper parallel surface, a reentrant surface defining a recess which is formed in one of said circular surfaces, and a spring detent which is fixed on said body member in position to engage said reentrant surface, said detent being so located angularly on said body member as to hold the 0°–180° axis of said scale in a position to serve as a lubber line directed parallel to the keel of said nautical craft, a circular rotatable member pivotally mounted at the center of said body member and extending thereover, and means operably constructed on said rotatable member for defining a horizontally divided field of view aimed toward the horizon, said means including an optically aligned aperture sight and a positive half-lens which are spaced from each other, said lens being optically aligned with said scale and being spaced therefrom at a distance substantially equal to its focal length.

6. A navigation pelorus for a boat comprising a circular body member which is supported on a gimbal mechanism in a normally level position and with its central axis normally erect and without rotation in azimuth, an annular seating surface formed on said body member in a plane normal to the central axis and concentric therewith, a smooth cylindrical surface formed on said body member in a position to join said annular seating surface, an erect cylindrical ring having its lower edge contacting said circular seat and fitted for relative rotation on said smooth cylindrical surface, a 360° angular scale formed on one of said circular surfaces contiguous to said upper parallel surface, a reentrant surface defining a recess which is formed in one of said circular surfaces, detent means operably aligned to releasably engage said reentrant surface to prevent angular displacement of said ring in the annular groove in which it is seated, said means being fixed to said body member and being so angularly located thereon as to hold the 0°–180° scale axis parallel to the keel of said boat, a circular rotatable member pivotally mounted at the center of said body member and extending thereover, and sighting means operably constructed on said rotatable member for defining a horizontally divided field of view aimed toward the horizon, said means including an optically aligned aperture sight and positive half-lens which are spaced along said line of sight from each other, said lens being optically aligned with said scale and being spaced therefrom at a distance equal to its focal length.

7. A navigation pelorus as set forth in claim 5 further characterized by said reentrant surface being formed on the inner surface of said cylindrical ring in line with the optimum location of said lubber line, said detent being an erect spring wire which is fixed at the bottom to said body member and has a protuberance formed thereon which engages said reentrant surface when said surface is aligned with the lubber line, whereby said spring wire serves primarily to indicate a point on said lubber line and secondarily enables the scale ring to be rotated to any desired angular setting to agree with the compass heading.

8. A navigation pelorus for a boat as set forth in claim 6 further characterized by said sighting means including an inclined semi-conical-like reentrant surface formed across the top of said rotatable member, said reentrant surface comprising a narrow portion located next to said aperture sight and a wide portion located adjacent to said ring, said positive half-lens being secured erectly in contact with the reentrant surface between the narrow and wide portions.

9. A navigation pelorus for a boat as set forth in claim 8 further characterized by said half-lens being semi-circular in outline shape, the straight side being uppermost and being substantially level with the top surface of said rotatable member.

10. A navigation pelorus for a boat comprising a circular body member which is supported on a gimbal mechanism in a normally level position so that its central axis is normally held erect but the member does not rotate in azimuth, a depressed circular surface defining a deep annular chamber formed in the top of said body member concentric with said central axis, an erect circular wall formed on the peripheral part of said chamber, a smooth cylindrical surface formed on the outside of said wall, an annular seating surface formed at the bottom of said smooth surface in a plane normal to said central axis, an erect cylindrical ring formed of light-conducting material and rotatably journaled on said smooth cylindrical surface and seated along its lower edge upon said annular seating surface, a 360° angular scale formed on one of the curved surfaces of said ring at the upper edge thereof, a rotatable member overlying said body member and ring, means for rotatably mounting the rotatable member on the body member for rotation about said central axis, sighting means including an erect aperture sight formed on the upper edge of said rotatable member and an inclined semi-conical reentrant surface having its small end located adjacent to said aperture sight and extending across the center thereof and downwardly to the proximity of said ring, said sighting means further including a positive half-lens which is secured erectly in a groove formed in said reentrant surface at an optical distance from said scale equal to the focal length of the lens, whereby both the scale and the distant horizon are seen simultaneously through the aperture sight, and means for illuminating said scale including a lamp mounted on the underside of said rotatable member adjacent to the lowest part of said reentrant surface.

11. A navigation pelorus for a boat, said pelorus having in combination a body member mounted by gimbal means in a normally level attitude, an upstanding cylindrical ring formed peripherally on said body member, a 360° scale formed on the outside curved wall of said ring, the 0° to 180° axis of the scale being directed parallel to the keel of the boat so as to constitute a lubber line, a rotatable member overlying said body member and rotatably mounted thereon, a Porro prism type of telescope characterized by an objective which forms an image of the horizon at the top edge of said scale and further characterized by an eyepiece which is focused on said image and scale simultaneously so that both appear in the field of view, and means for mounting said telescope on said rotatable member in a position such that said image point lies closely above said ring.

12. A sighting compass or the like having in combination a magnetic compass member which is characterized by an upstanding circular wall which outlines a hollow space, a 360° scale formed around the wall contiguous to the upper edge thereof, a circular body member underlying the cylindrical wall, pivot means cooperatively constructed on said body member and compass member for rotatably pivoting one member on the other, sighting means including a positive half-lens of semi-circular peripheral shape which is located at the center of a circle formed by said vertical cylindrical wall, the focal length of said lens being substantially equal to the radius of the circle, and the flat edge of said lens lying substantially in the plane of the top edge of said wall, said sighting means further including means for forming a peephole which is located on the optical axis of said lens at a distance therefrom substantially the same as said focal length, and means for mounting said lens and peephole means for pivotal movement as a unit about the axis of said cylindrical wall.

13. A navigation device for a ship, the device having in combination a body member, gimbal means for mounting said member in a normally level attitude, an elevated central pivot fixed erectly on the upper side of said member, a circular bowl-shaped compass member, means including a centrally elevated conical portion constructed on the bottom wall of the compass member to freely and pendulously support the compass member for rotation, the apex of said conical portion being in contact with said pivot, a pair of bar magnets fixed to said bottom wall in radial alignment with said conical portion on opposite sides thereof, an upstanding circular rim formed on the upper part of said compass member, a 360° scale formed on one of the curved walls of said rim adjacent the top thereof, a cover member enclosing and spaced from said compass member, said cover member having a cylindrical side wall which terminates at the bottom in a planar edge, a plurality of contiguous circular walls which cooperatively form an annular groove in the peripheral part of said body member, said groove being slidably fitted to receive the aforesaid planar edge of said cover member for sliding motion therein, sighting means including an erect aperture sight formed on the uppermost part of said cylindrical wall of the cover member, and further including an inclined semi-conical reentrant surface having its apex end at said aperture sight and extending therefrom downwardly across the center of the cover member to the proximity of said ring, and said sighting means further including a positive half-lens which is secured crosswise on said reentrant surface of the cover member at an optical distance from said scale which is equal to the focal length of said lens whereby both the scale and the distant horizon are seen simultaneously at infinity through the aperture sight.

No references cited.

HARRY N. HAROIAN, *Primary Examiner.*